Oct. 26, 1948. J. E. A. BLANCHET Re. 23,046
CORE FOR YARN OR THREAD PACKAGES AND METHOD OF MAKING THE SAME
Original Filed Dec. 5, 1940
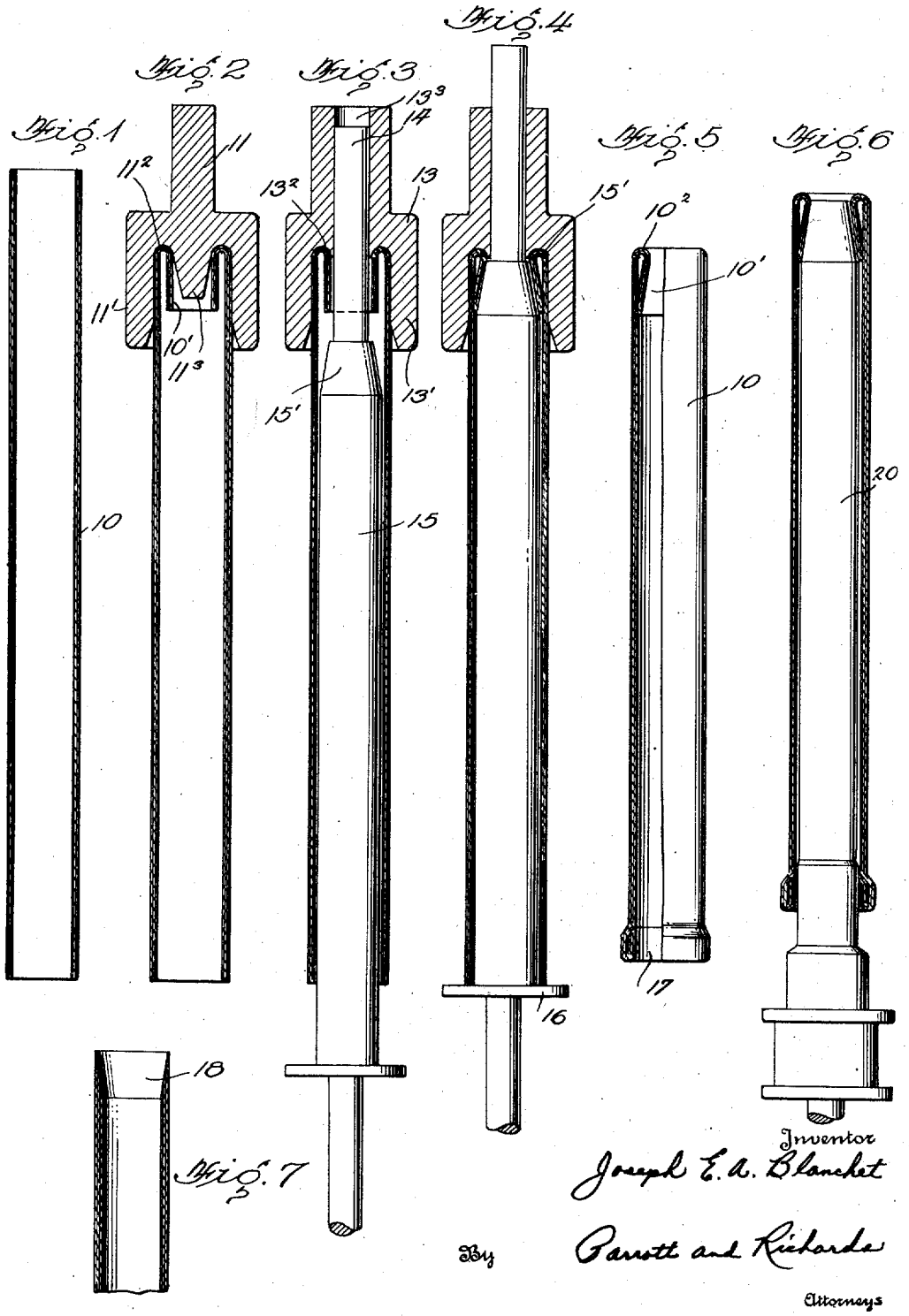
Inventor
Joseph E. A. Blanchet
By Parrott and Richards
Attorneys Reissued October 26, 1948

Re. 23,046

UNITED STATES PATENT OFFICE 23,046

CORE FOR YARN OR THREAD PACKAGES AND METHOD OF MAKING THE SAME

Joseph E. A. Blanchet, Mystic, Conn., assignor to Sonoco Products Company, Hartsville, S. C., a corporation of South Carolina Original No. 2,288,966, dated July 7, 1942, Serial No. 368,742, December 5, 1940. Application for reissue April 26, 1947, Serial No. 744,260

9 Claims. (Cl. 93—94)

This invention relates to cores for packages or windings of thread or yarn and particularly to cores of the general type employed in spinning operations, as in the spinning of cotton yarn or twisting of cotton or other threads.

Heretofore such cores or bobbins have been commonly fabricated of wood and wooden bobbins have proven to be eminently satisfactory where speeds of revolution have not been high. The present tendency of the textile operator engaged in the spinning of yarn, particularly cotton yarn, is to operate his spindles at higher and higher speeds in the attempt to accelerate the rate of production. To perform satisfactorily at high speeds, a spindle driven bobbin must be perfectly balanced or the spindle upon which the bobbin is mounted will rapidly become excessively worn. Bobbins fabricated of wood, when driven at speeds greater than a determined safe speed, wear due to the fact that the wood is non-uniform in density around the circumference of the bobbin, thus causing the center of gravity of the bobbin to be to one side of its geometric axis. At a spindle speed of 14,000 revolutions per minute, for instance, at which speeds, or even higher speeds, it is now desirable to rotate yarn cores or bobbins in spinning, a very slight eccentricity of the center of gravity of the bobbin will cause materially increased spindle wear. This is quite independent of the material of which the bobbin is fabricated, of course, and the undesirable spindle wear will occur when bobbins which are fabricated of materials other than wood are in use, if eccentricity of the centers of gravity exists.

It is a matter of primary importance, therefore, to utilize yarn or thread cores which are perfectly balanced about their central longitudinal axes and it is a primary object of the present invention to provide such a core or bobbin, one which may be revolved by the spindle upon which it is mounted at any speed within reason without exerting on the spindle any appreciable radial thrust which would tend to cause wear of the spindle or spindle bearings. This object I accomplish by forming the core or bobbin of paper, a paper sheet of the desired texture and thickness being wound convolutely into tubular form, the blank cutting and winding operations being so controlled as to produce a uniformly balanced tube. The tube thus formed is further acted upon, in such manner as not to destroy its balance, to provide an interior tapered sleeve with a frusto-conical bearing surface adapted to engage a similarly formed surface of the spindle, whereby the core or bobbin may be both supported upon the spindle and frictionally driven thereby. By preference the tube is wound convolutely and is of uniform section from end to end rather than of tapering character and the sleeve-like portion within the body of the tube is provided with a spindle engaging frusto-conical surface which makes an angle with the axis of the tube, the core receiving surface of the spindle being correspondingly tapered.

I have devised a paper tube which is entirely suitable, when used as a core to support thread or yarn, particularly cotton thread or yarn, in a spinning operation, for use at high spinning speeds, being perfectly balanced so as not to develop a radial thrust upon the spindle upon which it is supported when rotating at high speed. The one-piece core has a frusto-conical surface to be placed over and to closely engage a similar surface of identical taper on the upper end of the rotatable spindle of a spinning machine, the spindle engaging frusto-conical surface being the inside surface of an inner sleeve-like portion of the tube which is connected to the outer or thread receiving portion by a web which is integral with both the outer tube and the inner sleeve.

Due to the fact that the spindle engaging sleeve is in reality an integral part of the tube, there can be no separation of this sleeve from the tube. A strong force tending to twist the spindle engaging portion of the tube and to separate it from the thread receiving and supporting portion will occur when the core or bobbin, or the thread package wound upon it, are suddenly stopped by the hand of the spinner, the driving effort of the prime mover continued and the belt which drives the spindle being forced to slip upon the driving or driven pulley. Where, as here, the connection between the tube proper and the inner sleeve comprises a web which is integral with both tube and sleeve, the possibility that the sleeve may be broken away from the tube by torque so applied is eliminated. I also, in order to make the tube as durable as possible and well able to withstand the rough handling to which it is subjected in actual use, form a reinforcing bead or rib at the end thereof which is remote from that at which the spindle engaging sleeve is located, a short length of the tube being inturned and, after being inturned, preferably expanded slightly so as to make the inner diameter of the tube at the bead approximately equal to the inner diameter of the tube at all other points save only at the spindle engaging sleeve, it being desired that the tube shall clear the spindle upon which it is mounted along its entire length and that the only areas of engagement of the tube or core and spindle be those of the inner surface of the sleeve and the tapered surface of the spindle which is shaped to receive it.

Also, either before or after the completion of the core by deforming its ends in the stated manner, I preferably impregnate the same with a hardening solution which tends to stiffen the tube without rendering it brittle. Any suitable hardening solution may be employed for this purpose. Care is taken in inturning the ends of the tube to eliminate the possibility of breakage of the fibers of the paper, at least to any material extent, which might result in weakening of the tube at any point.

A novel method of and means for inturning the end of the tube will be hereinafter described, together with other instrumentalities employed in the shaping of the inturned portion of the tube into frusto-conical form. It will be appreciated by one skilled in the art that, within the import of the invention, minor changes may be made in the instrumentalities employed in the fabrication of the tube, in the method followed, and in the tube itself. That which has been selected for illustration by way of example, however, will be found to be eminently satisfactory in actual use.

In the drawing:

Figure 1 shows in axial section a convolutely wound paper tube, commonly known in the art as a "parallel tube" since it is of uniform diameter from end to end;

Figure 2 illustrates rather diagrammatically the die for and the method of inturning one end of the tube in the formation of the inner spindle engaging sleeve;

Figure 3 is a view showing the mechanism for acting upon the spindle engaging sleeve to reduce this sleeve to tapered form, the parts adapted to act upon the sleeve being shown in the positions which they occupy just before the tapering operation is performed;

Figure 4 is a similar view but showing the operating parts of the sleeve tapering mechanism in the positions which they occupy at the conclusion of the taper forming operation;

Figure 5 shows the completed tube, partially in side elevation and partially in section, the lower end of the tube being shown to have an integral reinforcing bead;

Figure 6 shows the completed bobbin or core in section, mounted upon the spindle of a spinning frame, which spindle is shown in elevation; and Figure 7 is a view of a convolutely wound tube such as that shown in Figure 1 but one end of which has been beveled for purposes hereinafter to be made clear.

The paper employed may be as desired and the tube which is to be acted upon may be formed in any suitable way. Preferably I form the tube by winding a paper sheet upon a mandrel to form a tube several plies in thickness, such as that indicated at 10 in Figure 1, the ends of the tube being accurately trimmed at right angles to its axis and the tube then being allowed to dry. By exercising care in winding and by beveling the leading and trailing edges of the sheet from which the tube is fabricated, a tube which is perfectly balanced about its axis is formed.

After the adhesive employed in securing the several plies or convolutions of the tube together has dried, one end of the tube is pressed axially against a rapidly rotating die of the type indicated at 11 in Figure 2, this die having a sleeve-like portion 11' the inner diameter of which is only slightly greater than the outer diameter of the tube, the inner wall of the sleeve-like portion merging with the wall of the annular groove 11², which is semi-circular in all radial sections, a central cone-like mandrel portion 11³ being provided, with the conical surface of which the curved surface of the groove 11² also smoothly merges. The sleeve-like portion 11' of the die 11 serves as a support and guide for the tube during the inturning operation and a sufficient pressure is continuously exerted upon the outer end of the tube to cause its inner end to be inturned to the extent shown in Figure 2, the fibers of the paper of which the tube is fabricated remaining uninjured. After the inner sleeve 10' has been fabricated in the manner just described, the tube is removed from the rotating die 11 and is inserted in a supporting member 13 which is likewise provided with a tube encircling sleeve 13' and a groove 13² for the reception of the end of the tube, so that both this end and a substantial portion of the adjacent part of the tube are firmly supported. The member 13 is shown to have a central cylindrical bore 13³, which receives with a sliding fit the rod-like extension 14 of a shaping mandrel 15. The outer diameter of mandrel 15 is only slightly less than the inner diameter of tube 10 and this mandrel is provided with a tapering section 15' which is substantially the same in area and angle of slope as the core receiving surface of the spindle upon which the tube is eventually to be mounted. After the several elements have been positioned as shown in Figure 3, the mandrel 15 is advanced so that its tapering portion 15' enters the sleeve 10' of the tube 10, the mandrel being advanced until the annular shoulder 16 which is fixed thereon strikes the outer end of the tube, as indicated in Figure 4, whereupon the movement of the mandrel is terminated. Mandrel 15 may be rotated, if desired, during this operation, but it is not essential that this be done.

In moving into the position shown in Figure 4, the mandrel expands the inturned sleeve 10' into the form of a frustum of a cone, the completed tube shown in Figure 5 having a frusto-conical sleeve 10' connected to the tube 10 by means of a continuous web 10² which is integral with both the tube and the sleeve and constitutes a permanent connection between these two portions of the core. A bead generally indicated at 17 is preferably formed upon the lower or opposite end of the tube by inturning a relatively short section of the tube at that end by the aid of a die such as shown in Figure 2, and a mandrel having a tapered end and cylindrical body of the same diameter as the inside of the tube. By inserting the mandrel into the end of the tube the inturned end portion may be pressed outwardly and the tube end also expanded, it being desired that no portion of the tube except the frusto-conical inner surface of the sleeve 10' shall contact with the spindle 20 when placed in operative position thereon, with the frusto-conical inner face of the sleeve in contact with the similarly formed surface 20' of the spindle, as indicated in Figure 6.

In certain cases it may be desired to interiorly bevel or taper, as by a grinding operation, that end of the tube which is to be inturned for the formation of the spindle engaging sleeve, as indicated at 18 in Figure 7. This will facilitate formation of the sleeve since that "corner" of the inturned portion which would otherwise contact with the inner wall of the body of the tube and resist further displacement under the pressure of the forming mandrel, has been removed. After the core has been completed and resembles that shown in Figure 5, I may or may not immerse it in a hardening solution. Employment of a hardening solution is dependent upon the degree of reinforcement required for varying usage. By the impregnation also the surface of the core, which is perfectly smooth at the completion of the forming operations is maintained in a smooth condition, which of course is to be desired.

Having thus described the invention, what is claimed as new and desired to be secured by Letters Patent is:

1. A paper core for a yarn or thread package comprising a convolutely wound tube with inturned end portions, the inturned portion at one end of the tube having a frusto-conical surface of sufficient length, measured axially of the tube, to grip a correspondingly tapered spindle end and to adequately support the core and a thread package on such spindle, and the inturned portion at the other end comprising a reinforcing rib or bead.

2. The method of forming a paper core for a yarn or thread package which comprises forming a multi-ply paper tube by convolutely winding a paper sheet, inturning one end thereof by pressing the same against a rotating die which is provided with a transversely curved annular groove concentric with the axis of rotation of the die and of such diameter as to receive the end of the tube, and thereafter imparting a frusto-conical form or shape to said inturned end by thrusting a frusto-conical die axially into the same to successively expand annular sections thereof, beginning with the section at the inner end, while at the same time supporting the outer wall surface of the tube.

3. The method of forming a paper core for a yarn or thread package which comprises forming a paper tube by convolutely winding a paper sheet, turning into the interior of the tube by means of a rotating die without breaking the fibers of the tube, a substantial portion of the end thereof, and thereafter expanding said inturned portion into frusto-conical form by means of a conical plunger inserted axially into the tube from the opposite end thereof in such manner as to circumferentially stretch all annular sections of said inturned portion.

4. A paper core for a yarn or thread package comprising a tubular portion the outer surface of which is adapted to receive and support the inner windings of a thread or yarn package and a spindle-engaging sleeve portion within and adjacent one end of said tubular portion, said tubular and sleeve portions being concentric and adjacent outer ends thereof being connected by a web portion which is integral with both, the said spindle-engaging sleeve having an inner spindle-engaging surface and being of sufficient length, measured axially of the tube, to adequately support the core, and any thread package mounted thereon, upon the spindle, and to maintain driving engagement with the spindle during rotation thereof.

5. A paper core for a yarn or thread package comprising a cylindrical body portion the outer surface of which is adapted to receive and support the inner windings of a thread or yarn package and a spindle-engaging sleeve portion within and adjacent one end of said body portion, said body and sleeve portions being concentric and adjacent outer ends thereof being connected by a continuous web which is integral with both such portions, the said spindle-engaging sleeve having an inner frusto-conical spindle-engaging surface and being of sufficient length, measured axially of the tube, to adequately support the core, and any thread package mounted thereon, upon the spindle, and to maintain driving engagement with the spindle during rotation thereof.

6. The method of forming a paper core for a yarn or thread package which comprises forming a tubular member of paper the outer surface of which is adapted to receive and support the inner windings of a thread or yarn package, inturning one end thereof to form a spindle-engaging sleeve portion of reduced diameter within and integral with the outer or thread package supporting portion, and thereafter imparting a spindle gripping frusto-conical surface to said inturned end by thrusting a frusto-conical die axially into the same from the inner end while supporting the outer wall surface of the outer portion of the tube.

7. A core for a yarn or thread package comprising a tubular portion the outer surface of which is adapted to receive and support the inner windings of a thread or yarn package and said core being made of a sufficiently flexible material to be turned in to provide a spindle-engaging sleeve portion within and adjacent one end of said tubular portion, said tubular and sleeve portions being concentric and adjacent outer ends thereof being connected by a web portion which is integral with both, the said spindle-engaging sleeve having an inner spindle-engaging surface and being of sufficient length, measured axially of the tube, adequately to support the core, and any thread package mounted thereon, upon the spindle, and to maintain driving engagement with the spindle during rotation thereof.

8. A paper core for a yarn or thread package comprising a cylindrical body portion the outer surface of which is adapted to receive and support the inner windings of a thread or yarn package and a spindle-engaging sleeve portion within and adjacent one end of said body portion, said body and sleeve portions being concentric and adjacent outer ends thereof being connected by a continuous web which is integral with both such portions, the said spindle-engaging sleeve having an inner frusto-conical spindle-engaging surface and being of sufficient length, measured axially of the tube, adequately to support the core, and any thread package mounted thereon, upon the spindle, and to maintain driving engagement with the spindle during rotation thereof, and there being a slight gap or air pocket between said spindle-engaging sleeve and the opposite wall of the body portion that provides a cushioning effect and insures a good driving fit between said spindle-engaging sleeve and the spindle.

9. The method of forming a core for a yarn or thread package which comprises forming a tubular member of a sufficiently flexible material to be turned in, the outer surface of which is adapted to receive and support the inner windings of a thread or yarn package, inturning one end thereof to form a spindle-engaging sleeve portion of reduced diameter within and integral with the outer or thread package supporting portion, and thereafter imparting a spindle gripping frusto-conical surface to said inturned end by thrusting a frusto-conical die axially into the same from the inner end while supporting the outer wall surface of the outer portion of the tube.

JOSEPH E. A. BLANCHET.

No references cited.